United States Patent Office 3,158,551
Patented Nov. 24, 1964

3,158,551
MALTING PROCESSES INVOLVING TREATMENT WITH A GIBBERELLIC ACID PRODUCT
Alan Macey and Keith Christopher Stowell, Newark-on-Trent, England, assignors to Associated British Maltsters Limited, Newark-on-Trent, England, a British company
No Drawing. Filed June 15, 1962, Ser. No. 202,973
Claims priority, application Great Britain, June 23, 1961, 22,910/61
13 Claims. (Cl. 195—70)

This invention concerns the malting of cereal grains and relates especially to the malting of barley.

In the production of malt from barley the grain is first steeped in water at ambient temperature and thereafter the grain is placed in boxes or drums or spread on a floor (the operation known as flooring) where it germinates. During germination the grain is modified by development of enzymes which convert the proteins of the grain into simpler substances which are more soluble and/or diffusible. At the same time there is growth of the embryo of the grain and development and growth of rootlets. The germination period extends from about six to ten days depending on various conditions and during germination the grain respires and heat is produced. When germination has proceeded to a required extent the grain is kilned to arrest germination and impart particular characteristics to the malt, the grain being thereafter screened during which the rootlets are removed and discarded. The discarded rootlets and the grain respiration represents a loss, the so-called "malting loss." The malting loss is, for example, of the order of 8%.

We have proposed in our U.S. patent application 109,884, and now abandoned, a process for malting of cereal grain (more especially barley) which comprises treating the grain with a gibberellic acid product and also with sodium or potassium bromate either before or during germination. It is preferred, according to a feature of this invention, that the grain is simultaneously treated with the gibberellic acid product and with sodium or potassium bromate.

The expression "gibberellic acid product" includes gibberellic acid itself and functional derivatives of gibberellic acid having known plant growth promoting properties (e.g., alkali metal or alkaline earth metal salts such as the sodium, potassium or calcium salt, the ammonium salt or mono-, di-, or tri-esters).

Thus, if barley is steeped in a solution containing potassium bromate and gibberellic acid of appropriate concentration it is found that the starch in the endosperm of the grain appears to modify satisfactorily to produce malt without apparent growth of the embryo, and with a consequent reduction in malting loss to about 3% or 4%. It is therefore suggested that growth of the embryo is not necessary for satisfactory malting if the process utilises gibberellic acid during steeping of the grain.

This invention has for its object to provide a malting process by which growth of the embryo is arrested or prevented while enabling the grain to be satisfactorily modified.

According to this invention the malting process comprises subjecting the embryo to heat such as at least to arrest growth thereof without damage to the grain and also treating the grain with a gibberellic acid product. The latter may be used in association with sodium or potassium bromate as set forth above.

According to a feature of the invention the grain is immersed in hot water to subject the embryo to heat and it is preferred that this be done at the steeping stage of the process, i.e., by utilising hot steeping water. It is a feature of this invention that the grain is treated with a gibberellic acid product after or during the heat treatment referred to and preferably that the acid product be contained in a steeping liquor. Thus, it may be that the grain is steeped, firstly, in hot water and, secondly, in a liquor containing gibberellic acid product. Preferably the last steep in the process contains the acid product. The steeping liquor containing the gibberellic acid product may be at ambient temperature or it may be hot.

The temperature of the hot steeping liquor may vary from 85° F. to 160° F. At the lower temperature the malting loss is normal, e.g., between 8% and 10%, while at 160° F. the modification is incomplete to the extent that substantially no malting occurs. The hot treatment may last from 2 to 6 hours.

One practical steeping procedure according to the process of this invention is as follows:

1st steep water cold and of 24 hrs. duration,
2nd steep water cold, containing gibberellic acid product, and of 24 hrs. duration.

and another practical procedure is:

1st steep water cold and of 24 hrs. duration,
2nd steep water hot and of 2 hrs. duration, and containing a gibberellic acid product.

The hot-water steep may last longer than 2 hrs., as indicated above, but this is considered to be the optimum period. If insufficient time is allowed embryo growth is not prevented; if the hot water steep is prolonged unduly the grain swells excessively and on subsequent drying at the end of the malting process the finished malt has a pinched and shrivelled appearance.

The temperature of the water in which the grain is steeped has some influence on the subsequent malting behaviour as illustrated in the following table. The conditions are those appertaining to a treatment with 2 parts per million with respect to the dry weight of grain of a gibberellic acid product in the steep water; if a lower concentration is employed the time necessary for modification is increased.

| Temp. of hot water steep, °F. | Behavior during malting | Quality of finished malt | Malting loss, percent |
|---|---|---|---|
| 90 | Partial rootlet inhibition of rootlets until day 3 followed by strong growth. Modification complete in 120 hrs. | Normal | 8 to 10 |
| 100 | Inhibition of all rootlets for 3 or 4 days followed by weak growth. Modification complete in 120 hrs. | Normal | 6 to 7 |
| 110 | Inhibition of all rootlets throughout. Modification complete in 96 hrs. | Normal | 3 to 4 |
| 120 | Inhibition of all rootlets. Modification complete in 120 hrs. | Normal except for a loss of 5–10° Lintner in Diastase. | 3 to 4 |
| 140 | Inhibition of all rootlets. Modification complete in 168 hrs. | Low extract, Soluble Nitrogen and Diastase. | 3 to 4 |
| 160 | Inhibition of all rootlets. Modification very slow and not complete after 12 days. (re. virtually no malting of the corn is occurring.) | Unsatisfactory | |

It is possible that when using other barley varieties from different origins and seasons the temperature, time of modification and malting loss would alter slightly.

The following examples illustrate the invention but are not to be regarded as limiting it in any way:

*Example 1*

Barley steeped 6 hrs. at temperature indicated followed by 24 hrs. at 55° F. in a solution containing 2 parts per million gibberellic acid, in respect to the dry weight of barley.

|  | 85° F. | 95° F. | 105° F. | 120° F. | 160° F. |
|---|---|---|---|---|---|
| Dry Extract, lbs | 102.9 | 102.1 | 102.3 | 98.4 | 86.2 |
| Cold Water Extract, percent | 20.4 | 19.2 | 19.4 | 17.1 | 11.3 |
| Permanently soluble Nitrogen, percent | 0.63 | 0.59 | 0.54 | 0.49 | 0.41 |
| Diastatic Power, ° L | 63 | 63 | 64 | 45 | 24 |
| Germination Period, hrs | 144 | 144 | 144 | 192 | 192 |
| Malting Loss, percent | 9.8 | 8.1 | 4.1 | 3.9 | 3.0 |

*Example II*

Barley steeped 24 hrs. at 55° F. followed by 6 hrs. at 105° F. in solution indicated. Gibberellic acid and potassium bromate weights in respect to the weight of barley were varied as follows:

|  | I | II | III | IV | V |
|---|---|---|---|---|---|
| Dry Extract, lbs | 102.9 | 102.1 | 102.6 | 102.0 | 97.2 |
| Cold Water Extract, Percent | 18.4 | 18.7 | 18.2 | 17.3 | 15.8 |
| Diastatic Power, Percent | 45 | 51 | 47 | 38 | 29 |
| Permanently Soluble Nitrogen | 0.64 | 0.54 | 0.53 | 0.43 | 0.39 |

Table I—2 p.p.m. Gib. Acid.
Table II—2 p.p.m. Gib. Acid+100 p.p.m. potassium bromate.
Table III—2 p.p.m. Gib. Acid+250 p.p.m. potassium bromate.
Table IV—2 p.p.m. Gib. Acid+500 p.p.m. potassium bromate.
Table V—2 p.p.m. Gib. Acid+1,000 p.p.m. potassium bromate.

The effect of utilising a bromate in association with a gibberellic acid product gives an expected effect inasfar as the protein modification of the grain is curtailed—see U.S. patent application 109,884, and now abandoned. The concentration of bromate needed to give this effect is, however, appreciably lower than when the grain has been steeped conventionally.

The grain, instead of being steeped as described may be sprayed with either a gibberellic acid product or a mixture of bromate and a gibberellic acid product after steeping in hot water alone. The quantities of bromate (e.g., potassium) and gibberellic acid are then different to those employed when steeping the grain in a liquor containing an acid product with or without bromate. There is a greater efficiency of utilisation when spraying is employed, and consequently a smaller weight of chemical is required to produce similar effects.

The following limits have been found to be applicable:

Gibberellic acid: When used in the steep water or when
    spraying 0.05 to 5 p.p.m. in respect to weight of grain.
Potassium bromate:
    (a) Steeping—50 to 1000 p.p.m. in respect to weight of grain.
    (b) Spraying—10 to 200 p.p.m. in respect to weight of grain.

The invention may be summarised as a malting process involving destruction of the grain embryo and the use of a gibberellic acid product—alone or with potassium or sodium bromate—to effect modification of the grain without growth of the embryo. In this way the malting loss is materially reduced, for instance, by as much as 50% of the loss which is normally encountered.

We claim:

1. A process for the malting of cereal grain, which comprises the steps of heating the grain to between 85° F. and 160° F. to arrest growth of the grain embryo without damage to the grain and treating the heated grain with a gibberellic acid product in the proportion of 0.05 to 5 parts per million in respect to the dry weight of the grain to be treated.

2. A process as claimed in claim 1 wherein said step of heating the grain is performed by treating the grain with hot water.

3. A process according to claim 2 in which said step of heating the grain is performed by steeping the grain in hot water.

4. A process according to claim 1 in which the grain is treated with the gibberellic acid product after completion of the step of heating the grain.

5. A process as claimed in claim 4 in which the said gibberellic acid treatment is performed by steeping the grain in water containing a gibberellic acid product, the acid product being dissolved in the steeping water.

6. A process for the malting of cereal grain comprising the steps of heating the grain to between 85° F. and 160° F. to arrest growth of the grain embryo without damage to the grain and concurrently treating the grain with a gibberellic acid product in the proportion of 0.05 to 5 parts per million in respect to the dry weight of the grain to be treated.

7. A process as claimed in claim 6 in which the grain is steeped in hot water containing a gibberellic acid product dissolved therein.

8. A process for the malting of cereal grain which comprises heating the grain to between 85° F. and 160° F. to arrest growth of the grain embryo without damage to the grain and thereafter spraying the grain with a gibberellic acid product in the proportion of 0.05 to 5 parts per million in respect to the dry weight of the grain to be treated.

9. A process for the malting of cereal grain which comprises the steps of heating the grain to between 85° F. and 160° F. to arrest growth of the grain embryo without damage to the grain and treating the heated grain with a gibberellic acid product in the proportion of 0.05 to 5 parts per million in respect to the dry weight of the grain to be treated and with a bromate in the proportion of 10 to 1000 parts per million with respect to the dry weight of the grain.

10. A process according to claim 9 wherein the grain is steeped in a solution of bromate in which the bromate is used in the proportion of 50 to 1000 parts per million with respect to the dry weight of the grain.

11. A process according to claim 9 wherein the grain is sprayed with a solution of bromate in which the bromate is used in the proportion of 10 to 200 parts per million with respect to the dry weight of the grain.

12. A process for the malting of cereal grain which comprises steeping the grain in hot water at a temperature of between 85° F. and 160° F. for from 2 to 6 hours and thereafter treating the grain with a gibberellic acid product in the proportion of 0.05 to 5 parts per million in respect to the dry weight of the grain to be treated and spraying the grain with a solution of sodium bromate in which the bromate is used in the proportion of 10 to 200 parts per million with respect to the dry weight of the grain.

13. A process for the malting of cereal grain which comprises steeping the grain in hot water at a temperature of between 85° F. and 160° F. for from 2 to 6 hours and thereafter treating the grain with a gibberellic acid product in the proportion of 0.05 to 5 parts per million in respect to the dry weight of the grain to be treated and spraying the grain with a solution of potassium bromate in which the bromate is used in the proportion of 10 to 200 parts per million with respect to the dry weight of the grain.

References Cited in the file of this patent

UNITED STATES PATENTS

| 500,305 | Tilden | June 27, 1893 |
| 2,842,051 | Brian et al. | July 8, 1958 |
| 2,943,938 | Zeeuw et al. | July 5, 1960 |
| 2,960,409 | Macey et al. | Nov. 15, 1960 |
| 3,014,847 | Kneen | Dec. 26, 1961 |
| 3,085,945 | Lucksinger et al. | Apr. 16, 1963 |